INVENTOR.
DAVID COOPER

Sept. 9, 1969                   D. COOPER                  3,466,524
SPEED TAPER BRAKE MODULATION SYSTEM
Filed July 6, 1966                                    2 Sheets-Sheet 2
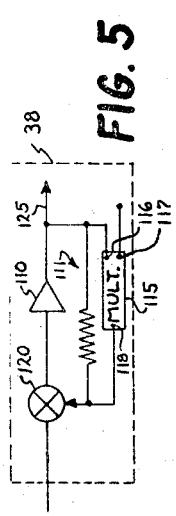
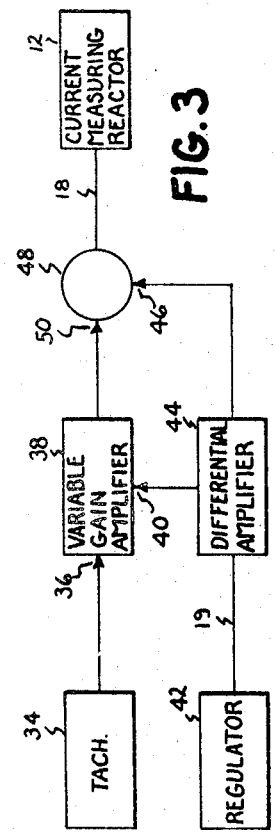
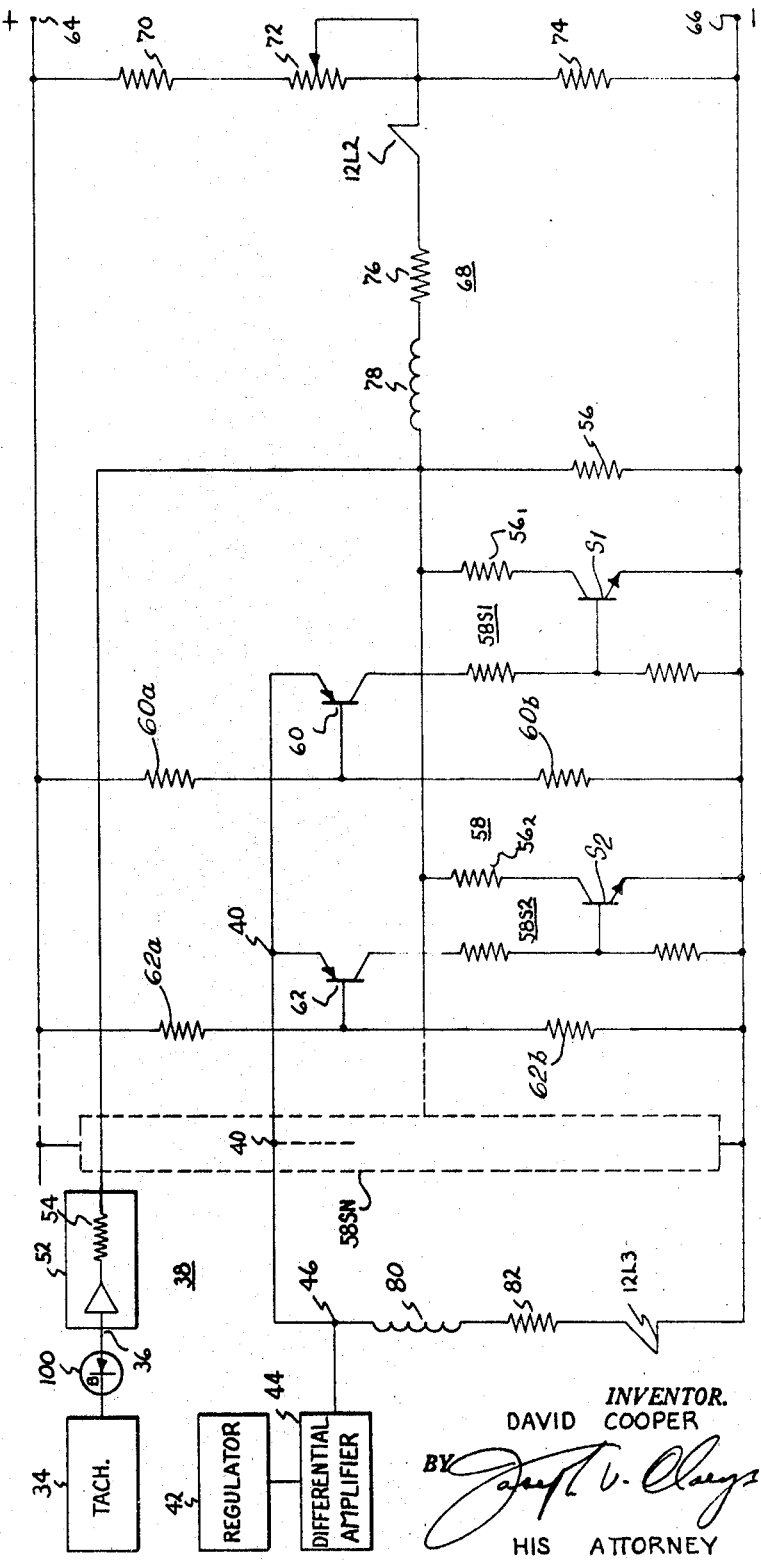
INVENTOR.
DAVID COOPER
BY
HIS ATTORNEY

United States Patent Office 3,466,524
Patented Sept. 9, 1969

3,466,524
SPEED TAPER BRAKE MODULATION SYSTEM
David Cooper, Erie, Pa., assignor to General Electric Company, a corporation of New York
Filed July 6, 1966, Ser. No. 563,266
Int. Cl. H02p 5/04, 7/10, 17/32
U.S. Cl. 318—363                               17 Claims

ABSTRACT OF THE DISCLOSURE

A speed taper brake modulation system wherein the dynamic braking rate is tapered at high speeds. A control circuit varies the armature circuit impedance as a desired function of armature current. A brake effort signal is applied through a summing circuit to effectuate such control. The tapered characteristic is provided by applying a signal related to the counter electromotive force of the motor, such as a speed signal, through a variable gain amplifier to a second input of the summing circuit. The gain of the variable gain amplifier is varied in response to the magnitude of the braking effort signal.

---

This invention relates to a system of modifying the characteristics of a dynamic braking system for an electric motor, and more particularly, to a system of this type which can be responsive to automatic control systems.

While this invention is capable of numerous applications, it may be particularly useful in automatic railway vehicle control systems. For example, recent emphasis on high speed, high performance urban rapid transit and railway systems has begun to tax the capabilities of traditional human operators of rapid transit and railway vehicles. The increasing complexities involved in operating these systems at full capacity, while still providing stringent safety requirements necessary for human passengers, emphasize the growing need for fully automatic operation of the systems.

In answer to this need, recent developments have employed vehicle carried apparatus for automatically operating rapid transit and other railway vehicles in accordance with a number of received command signals. The command signals may be transmitted from wayside and may be selected in accordance with local track and traffic conditions. Or, these signals may be transmitted in accordance with traffic conditions only, depending on the type of vehicle separation employed. A system of this type is disclosed and claimed in patent application Ser. No. 418,132, filed Dec. 14, 1964, now Patent No. 3,334,224, and assigned to the assignee of the present invention.

The above-identified system includes a regulator means which calculates the varying tractive efforts needed for automatic vehicle control. The system also includes means for establishing specific speed reference signals derived from signals received from wayside. Means are also provided for developing a signal representative of the actual speed of the vehicle. By comparison of the actual speed with the reference speed signal, the last mentioned means develop a speed error signal. Means are further provided for generating open loop speed signals, in response to the received signals, which schedule vehicle traction to maintain the reference speed under nominal conditions. Finally, means are provided for causing the vehicle tractive effort to be modulated about the open loop signal level to maintain the reference speed under operating conditions.

The system also includes means actuated by a received wayside signal for generating a preselected speed-distance program signal. These means also generate a signal representing the actual distance of the vehicle to a desired stopping point. The comparison of the last two signals produces a distance-error signal. Means are further provided for generating an open-loop braking rate signal adapted to schedule vehicle traction to stop the vehicle at the desired point under nominal conditions. Means are also provided to cause the vehicle traction to be modulated about the open-loop level to effect stopping of the vehicle at the desired point under actual operating conditions.

The above-described system is merely an example of the type in which the present invention is useful. In vehicle propulsion systems where vehicles are driven by electric motors, dynamic braking is used to help stop the vehicle to reduce the size and complexity of the mechanical braking system. First the propulsion energy is removed from the traction motors so that a voltage is generated by these motors as their armatures revolve with the moving vehicle. Energy is dissipated in a load connected across these traction motors, thereby decreasing the speed of the motors which in turn decreases the vehicle speed. Dynamic braking is of particular importance at high vehicle speeds in lieu of or to supplement mechanical braking systems. At these speeds traction motors generate high voltages which, as motor characteristic curves show, tend to cause motor failure due to such limiting motor characteristics as the motor sparking factor. When dynamic braking effort is desired at these higher motor speeds, either a heavier motor must be supplied to withstand the higher current and voltages, or the dynamic braking effort must be modified within the characteristics of the motor.

At high speeds, factors such as vehicle wind resistance and the weight of a vehicle play an increasing role in slowing a vehicle. Therefore, traction motors need not be loaded at the higher speeds to the same extent necessary at lesser speeds to brake the vehicle at a prescribed rate. Rather than provide an oversized traction motor for use in higher speed vehicles, it is desirable that the dynamic breaking effort be modified in accordance with the limitations of the motor.

It is therefore an object of this invention to provide an improved arrangement for modifying the characteristics of a dynamic breaking system to comply with the limiting characteristics of electric motors.

It is another object of this invention to provide an arrangement for modulating dynamic braking characteristics in response to an analog signal of the type generated by automatic control apparatus.

It is a further object of this invention to provide a dynamic braking system which modifies motor current flow in response to a combination of signals indicating actual motor speeds and signals calling for a prescribed braking effort.

Briefly stated, in accordance with one aspect of this invention, there is provided a new and improved speed taper brake modulation system. The system includes a first control means for varying the impedance of the armature circuit of an electric motor as a function of armature current and a second control means operatively associated with the first control means for varying the impedance of the armature circuit of the motor in a predetermined manner in response to a first input signal representing a desired dynamic braking effort and a second input signal related to the counter electromotive force of the motor which signal may be conveniently provided by a suitable speed sensing means operative to provide a signal proportional to the actual speed of the motor.

The novel features believed characteristic of the invention are set forth with particularity in the appended claims. The invention itself, however, both as to its organization and method of operation, together with further objects and advantages thereof, may best be understood by reference to the accompanying drawings in which:

FIGURE 3 shows a block diagram of a system for modifying dynamic braking characteristics in accordance with this invention;

FIGURE 4 is a schematic diagram elaborating on a portion of the system shown in FIGURE 3; and FIGURE 5 is a schematic circuit diagram of another suitable arrangement for providing an amplifier means whose gain varies inversely with an applied reference signal.

Figure 1:
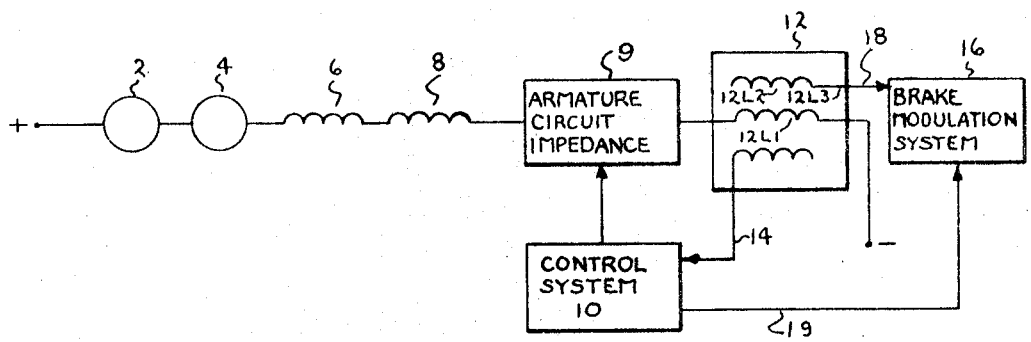
FIGURE 1 is a schematic diagram of a motor control system which includes this invention.

While not limited to any one application, this system is generally useful in systems where motor current is controlled during dynamic braking by motor control impedance which can be operated in response to a current measuring reactor. FIGURE 1 is a simplified schematic of a traction motor control circuit made in accordance with this invention. A pair of direct-current traction motors 2 and 4 are coupled through their series field windings 6 and 8, respectively, to a variable armature circuit impedance 9 the current flow through the motors.

The variable armature circuit impedance is controlled by control system 10 which is shown generally in block form only and may comprise any of a number of such systems which are well-known in the art. For example, it may be a motor control such as that described in U.S. Patent 3,184,664, Cunningham et al. assigned to the assignee of the present invention.

A current measuring reactor 12 senses the armature current flowing through its winding 12L1. A coupling means 14 is used to illustrate that the output from the reactor 12 can be coupled to the control system 10 to vary the armature impedance as a function of the armature current. In accordance with this invention, a brake modulation system, designated by block 16, is connected through a coupling means 18 to the reactor 12 to provide the tapered dynamic braking characteristics for high speed dynamic braking. This brake modulation system operates in response to signals coupled from the control system 10 through coupling means 19. It causes the reactor 12 to vary the armature impedance as a function of parameters other than armature current at high speeds.

Figure 2:
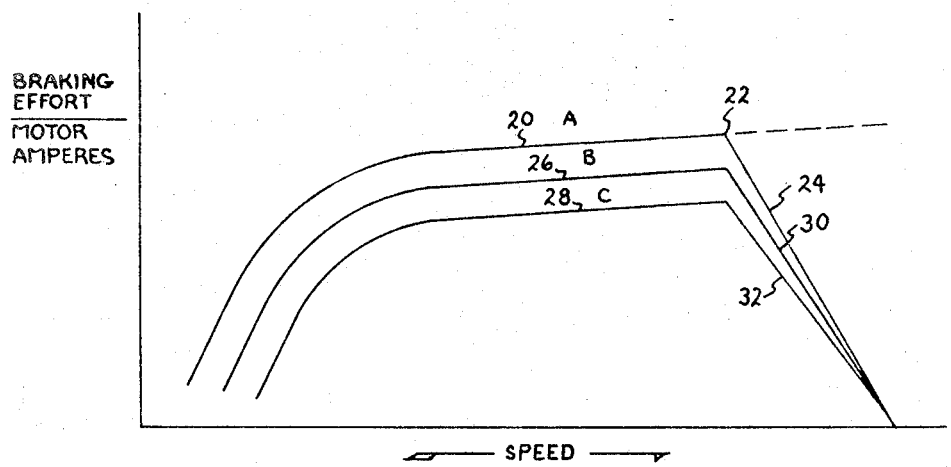
FIGURE 2 is a graph showing the braking effort characteristics of a direct-current, series wound traction motor, modified for dynamic braking purposes in acocrdance with this invention.

FIGURE 2 shows a family of braking effort characteristic curves A, B and C of a direct-current, series wound traction motor during dynamic braking. The portion 20 of the curve A shows the maximum dynamic braking effort within the limits of a tested motor. At a point marked 22 on curve A, the motor would begin to fail due to factors such as motor arcing caused by the high voltage generated at higher speeds. To prevent motor failure when dynamic braking is required at these speeds, the dynamic braking effort is modified as indicated by the portions 24, 30 and 32 of curves A, B and C respectively. Thus, the portion of curve 24 shows a tapered characteristic which is generated in accordance with this invention to provide high speed dynamic braking effort within the limitations of the motor. For some applications, a less than maximum braking effort may be desired. The characteristics B and C having tapered characteristic portions 30 and 32 show the motor characteristics at reduced braking effort levels.

FIGURE 3 shows a block diagram of one embodiment of the braking effort modulation system of the present invention. A signal related to the counter electromotive force of the motor being controlled, shown as provided by a speed sensing means 34, which generates signals proportional to the speed of a motor being controlled, is fed through a first input terminal 36 of a variable gain amplifier means 38, which also has a second input terminal 40. The variable gain amplifier means 38 amplifies the signals at the input terminal 36 with a gain which varies as a function of the input signals at the terminal 40. A braking effort signal shown as provided by a regulator 42 is applied through a differential amplifier 44 to the input terminal 40 of the variable gain amplifier means 38. The braking effort signal is also coupled to an input terminal 46 of signal summing means 48 having a second input terminal 50. The output from the signal summing means 48 is coupled through coupler 18 to the current measuring reactor 12.

To assure that the braking modulation system of this invention does not appreciably affect the current measuring reactor at low motor speeds, the signal proportional to the counter electromotive force of the motor may be arranged to be applied to the input terminal 36 only after it has reached a preselected magnitude. Conveniently, this may be provided by a breakdown diode device connected to the output of tachometer 34. Thus, for example, with a braking effort level indicated by the curve A in FIGURE 2, the breakdown diode would be operative to isolate the tachometer from the rest of the system below the speed at the point 22.

FIGURE 4 shows a portion of the brake modulation system in accordance with one embodiment of this invention with circuit elements corresponding to those shown in FIGURE 3 marked with the same reference numerals. The variable gain amplifier 38 comprises a differential amplifier 52 having an output impedance 54. Means, designated generally at 58, is provided for varying the effective load of differential amplifier 52, thereby varying its effective gain.

In the arrangmeent illustrated, the gain varying means 58 includes a plurality of switching circuits, shown as transistor switching circuits $58S_1$, $58B_2$, etc. including transistors $S_1$, $S_2$, etc., which are operative to effectively shunt an impedance 56 with additional impedances $56_1$, $56_2$, etc., to thereby reduce the effective gain of amplifier 52. Each of the transistors $S_1$, $S_2$, etc., is arranged to be rendered conductive at a different level of the signal from amplifier 44 applied to the respective input means of the switching circuits. This is conveniently accomplished, as shown, by including a transistor in the input means of each switching circuit. Each transistor is biased in its "off" or nonconducting condition by a different preselected reference voltage. This reference voltage is shown as being provided by a voltage divider means including the resistances $60_a$ and $60_b$ for switching circuit $58S_1$ and resistances $62_a$ and $62_b$ for switching circuit $58S_2$. Thus, resistances $60_a$ and $60_b$ establish one reference voltage level for input transistor 60 while resistances $62_a$ and $62_b$ establish a different reference voltage level for input transistor 62.

In operation, when the signal level at the terminal 40, which is connected to the emitter of the respective input transistors 60, 62, etc., exceeds the reference voltage of that input transistor, that transistor is turned "on" causing its associated switching circuit transistor $S_1$, $S_2$, etc., to be turned "on" effectively shunting impedance 56 with an additional impedance to thereby reduce the effective gain of amplifier 52.

For example, assume the level of the signal from amplifier 44 (which is applied to terminal 40) exceeds the reference voltage established for input transistor 60. Under such condition transistor 60 becomes conductive which in turn renders transistor $S_1$ conductive to effectively shunt impedance 56 with the impedance $56_1$ resulting in a decrease in the effective gain of amplifier 52. An increase in signal at terminal 40 sufficient to exceed the reference voltage established for transistor 62 will cause transistors 62 and $S_2$ to become conductive shunting load impedance 56 with the additional impedance $56_2$ to further reduce the effective gain of amplifier 52. Thus, the effective gain of differential amplifier 52 can be varied inversely with the level of the signal from regulator 42. As shown, the signal from regulator 42 is amplified in differential amplifier 44 and coupled from terminal 40 to the input means of the switching circuits 58S₁, 58S₂, etc.

Control winding 12L2 of current measuring reactor 12 is energized by a bridge circuit, designated generally at 68. Load impedances 54 and 56 make up two of the legs of the bridge circuit. The other two legs of the bridge circuit include a resistor 70 and a rheostat 72 in one leg with a resistor 74 in the other, both legs being coupled across the power supply terminals 64 and 66. The rheostat 72 adjusts the quiescent current flow through the series combination of winding 12L2, resistance 76, and inductance 78 in the absence of signals from the tachometer 34.

The summing means in FIGURE 4 includes means for coupling amplified signals from regulator 42 from the terminal 46 to a third control winding 12L3 of the current measuring reactor 12. These signals are coupled through inductance 80 and resistance 82 to adjust the quiescent activation level of the current measuring reactor 12 as the load impedance 56 is shunted by the transistor switching circuits.

The operation of the braking modulation system of the invention may best be explained by reference to FIGURES 2 and 4. Thus, during operation of the dynamic brake characteristic modulation system, signals proportional to the speed of a motor to be brake are amplified by the amplifier 52 in the variable gain amplifier 38 and are coupled through the load impedances 54 and 56. As the level of the speed signal varies, the energization of the bridge circuit 68 is varied as well, thereby changing the energization level of the control winding 12L2 of the current measuring reactor 12. The output from tachometer 34 is coupled through breakdown diode 100 to the terminal 36 of differential amplifier 52 when the motor speed increases to a magnitude requiring tapered braking characteristics. Thereafter, the speed is modulated in accordance with this invention. Should the dynamic braking effort level be that indicated by the characteristic curve B in FIGURE 2, for example, the regulator 42 generates a signal of such a level that the transistor 60 is turned "on" thereby turning on transistor S₁ of switching circuit 58S₁ to shunt the impedance 56₁ across the load impedance 56. Accordingly, the tapered characteristic generated by the brake modulation system 16 is changed from the curve 24, to the curve 30. As long as signals are coupled from the tachometer 34 having a level corresponding to that predetermined speed range, the dynamic braking characteristics vary in accordance with the curve 30. Similarly, if the level of the signal from the regulator 42 increases such that it activates other transistor switching legs, the tapered characteristic will be varied in accordance with the curve established thereby.

As signals from the regulator 42 vary the gain of the amplifier 38, there is a resulting variation in the energization of the winding 12L3 of current measuring reactor 12. For example, larger magnitude signals at the terminals 40 decrease the gain of the amplifier 52, decreasing its effects on the control winding 12L2 thereby increasing the energization of the control winding 12L3 to maintain the quiescent energization level of the current measuring reactor 12.

In FIGURE 5 there is illustrated within the dash line box 38' another arrangement suitable for providing an amplifier means whose output varies inversely with the level of a reference signal, such as the speed signal from tachometer 34, for exemple. As shown, the arrangement includes an operational amplifier 110 including a first feed-back path 111 as is conventional. A second feed-back path is also provided, however, which includes a multiplier circuit means 115 having a first input terminal 116, a second input terminal 117 and an output terminal 118. The output of the amplifier 110 is connected to the input terminal 116 of multiplier circuit means 115 and the output thereof is connected from the summing point 120 to the input of amplifier 110. The reference signal is applied to the second input terminal 117 of multiplier circuit means 115.

From the foregoing, it is evident that the output of multiplier circuit means 115 is proportional to the product of the amplifier output signal and the speed signal. This output from the multiplier is then applied to the input of amplifier 110 as a negative feed-back so that the output of amplifier 110, with this feed-back, which appears on the line 125 is inversely related to the speed signal.

Although in the foregoing specification the signal related to the counter electromotive force of the motor has been shown as derived by a speed sensing means 34 which provides a signal proportional to the speed of the motor, any other suitable means for deriving such a signal may be employed. For example, a suitable signal realted to the counter electromotive force of the motor may be derived by a voltage measuring reactor in well known manner.

What I claim as new and desire to secure by Letters Patent of the United States is:

1. A speed-taper dynamic braking modulation system for an electric motor comprising:
    (a) a first control means including a current sensing means operatively associated with the armature circuit of said motor for causing the impedance of said armature circuit to be varied as a function of armature current;
    (b) a second control means operatively associated with said first control means for causing the impedance of said armature circuit to be varied in a predetermined manner in response to a first electrical input signal related to the counter electromotive force of said motor and being proportional to the speed of said motor and a second electrical input signal representing a desired braking effort;
    (c) said second control means including circuit means for developing an output signal inversely related to a signal representing a desired braking effort.

2. The system of claim 1 wherein said circuit means for developing an output signal inversely related to the signal representing a desired braking effort comprises an operational amplifier means having a multiplier circuit in a feed-back loop thereof, said multiplier circuit having first and second input terminals and an output terminal with said first input terminal connected to the output of said amplifier means, said second input terminal connected to the source of braking effort signals and said output terminal being connected to the input of said amplifier to which the signal related to the counter electromotive force of said motor is applied so that the output of said operational amplifier with said feed-back is inversely related to said braking effort signal.

3. The system of claim 1 wherein said circuit means for developing an output signal inversely related to the signal representing a desired braking effort comprises amplifier means for amplifying the signal related to the counter electromotive force of the motor and means associated with the output of said amplifed means for selectively varying the value of a resitsance in said output as a function of the level of said braking effort signal so that the effective gain of said amplifier means is varied inversely with the level of said braking effort signal.

4. A speed-taper dynamic braking modulation system for an electric motor means comprising:
    (a) a first control means including a current sensing means opertaively associated with the armature circuit of said motor means for causing the impedance of said armature circuit to be varied as a function of the armature current;
    (b) circuit means responsive to a first input signal related to the counter electromotive force of said motor means and a second input signal representing a desired braking effort for amplifying said first signal with a gain which varies inversely with the level of said second input signal;

(c) means for summing the output of said circuit means with the signal representing a desired braking effort to provide a control signal; and (d) means coupling said control signal to said first control means to cause said first control means to vary the impedance of the armature circuit of said motor in accordance with said control signal.

5. The system of claim 4 wherein said first input signal is a signal proportional to the speed of said motor means.

6. A speed-taper dynamic braking modulation system for an electric motor means comprising:

(a) a first control means including a current measuring reactor operatively associated with the armature circuit of said motor means for causing the impedance of said armature circuit to be varied as a function of the energization level of said current measuring reactor to thereby provide for a variation of the impedance of said armature circuit as a function of armature current, said current measuring reactor including first and second control windings;

(b) circuit means responsive to a first input signal related to the counter electromotive force of said motor means and a second input signal representing a desired braking effort for amplifying said first input signal with a gain which varies inversely with the level of said second input signal;

(c) means applying the output of said circuit means to the first control winding of said current measuring reactor and the signal representing the desired braking effort to the second control winding thereof, said first and second control windings being operative to sum the signals applied thereto to produce a change in the energization level of said current measuring reactor so that said first control means is effective to vary the impedance of the armature circuit in response thereto.

7. The system of claim 6 wherein said first input signal is a signal proportional to the speed of said motor means.

8. A system for modulating the dynamic braking characteristics of an electric motor means, comprising, in combination:

(a) a first control means connected in the armature circuit of said motor means for varying the impedance of said armature circuit;

(b) speed sensing means for generating an output signal proportional to the speed of said motor means;

(c) regulator means for generating braking first signals;

(d) variable gain amplifier means having first and second input terminals, said amplifier means amplifying signals at said first input terminal with a gain which varies in response to signals at said second input terminal, means for coupling the output signals from said speed sensing means to said first input terminal, means for coupling braking effort signals to said second input terminal;

(e) means coupled to the output of said variable gain amplifier means and to the output of said regulator means for summing output signals from said amplifier means and the braking effort signals; and (f) means for coupling the output of the last mentioned means to said first control means to cause said first control means to vary the armature impedance in response to the summed signals.

9. A system according to claim 8 wherein said first control means includes a current measuring reactor.

10. A system according to claim 9 wherein said current measuring reactor includes a first control winding, said system further comprising a bridge circuit including said variable gain amplifier means, and means for connecting said first control winding in said bridge circuit.

11. A system according to claim 10 wherein said current measuring reactor includes a second control winding, said means for summing the output signals from said amplifier means and the braking effort signals including means for coupling said braking effort signals to said second bias winding to adjust the quiescent activation level of said current measuring reactor when the gain of said variable gain amplifier means is changed.

12. A system according to claim 8 including means for preventing signals proportional to the speed of said motor means from affecting said first control means below a predetermined motor speed.

13. A system for modulating the dynamic braking characteristics of direct-current traction motors, comprising, in combination:

(a) direct-current traction motor means having armature means;

(b) an armature control circuit electrically connected to said armature means of said motor means to vary the armature impedance thereof;

(c) speed sensing means for generating an output signal as a function of the speed of said motor;

(d) regulator means for generating braking effort signals;

(e) variable gain amplifier means having first and second input terminals, said variable gain amplifier means comprising a differential amplifier for amplifying signals at said first input terminal and coupling them to an impedance associated with the output, said variable gain amplifier means further comprising circuit means for controllably shunting said impedance to vary the effective gain of said amplifier means as a function of the signal level at said second input terminal;

(f) means for coupling the output signals from said speed sensing means to said first input terminal and means for coupling braking effort signals to said second input terminal;

(g) current measuring reactor means having first and second control windings, means for connecting said first control winding in circuit with said impedance associated with the output of said amplifier means, means for coupling said second control winding to thte output of said regulator;

(h) means for coupling said current measuring reactor to said armature control circuit to cause said armature control circuit to change the armature impedance in response to the energization of said first and second control windings.

14. A system according to claim 13 including a reference connected between said speed sensing means and said first input terminal to isolate the output of said speed sensing means from the input of said variable gain amplifier means until said motor exceeds a predetermined speed.

15. A system for modulating the dynamic braking characteristics of traction motors in response to braking effort signals comprising, in combination:

(a) means adapted to be electrically connected to the motor means for varying the armature impedance of the motor means;

(b) speed sensing means for generating an output signal in response to the speed of the motor means;

(c) variable gain amplifier means having first and second input terminals and an impedance associated with the output thereof, said variable gain amplifier means comprising a differential amplifier for amplifying signals at said first input terminal and coupling them to said impedance, said variable gain amplifier further comprising circuit means for controllably shunting said impedance to vary the effective gain of said differential amplifier as a function of the signal level at said second input terminal;

(d) means for coupling the output signals from said speed sensing means to said first input terminal and means for coupling the braking effort signals to said second input terminal;

(e) means for summing output signals from said variable gain amplifier means with the breaking effort signals; and (f) means for coupling the output of the last-mentioned means to said means for varying the armature impedance to cause it to vary the armature impedance in response to the summed signals.

16. A system according to claim 15 wherein said means for varying the armature impedance includes a current measuring reactor having a first control winding and a second control winding, means for connecting said first control winding in circuit with the impedance associated with the output of said variable gain amplifier means, and means for coupling said braking effort signals to said second control winding.

17. A system according to claim 15 including means for preventing output signals from said speed sensing means from being applied to said first input terminal of said variable gain amplifier means until the motor exceeds a predetermined speed.

References Cited

UNITED STATES PATENTS

| | | | |
|---|---|---|---|
| 2,627,597 | 2/1953 | Johansson | 318—367 XR |
| 3,184,664 | 5/1965 | Cunningham et al. | 318—58 |
| 3,249,841 | 5/1966 | Liebenthal | 318—367 |

ORIS L. RADER, Primary Examiner

ROBERT J. HICKEY, Assistant Examiner

U.S. Cl. X.R.

318—367, 369